Nov. 1, 1938.   R. W. CLIFFORD   2,135,032
VALVE GEAR FOR DISTRIBUTION VALVES OF STEAM LOCOMOTIVES
Filed May 20, 1937   9 Sheets-Sheet 1
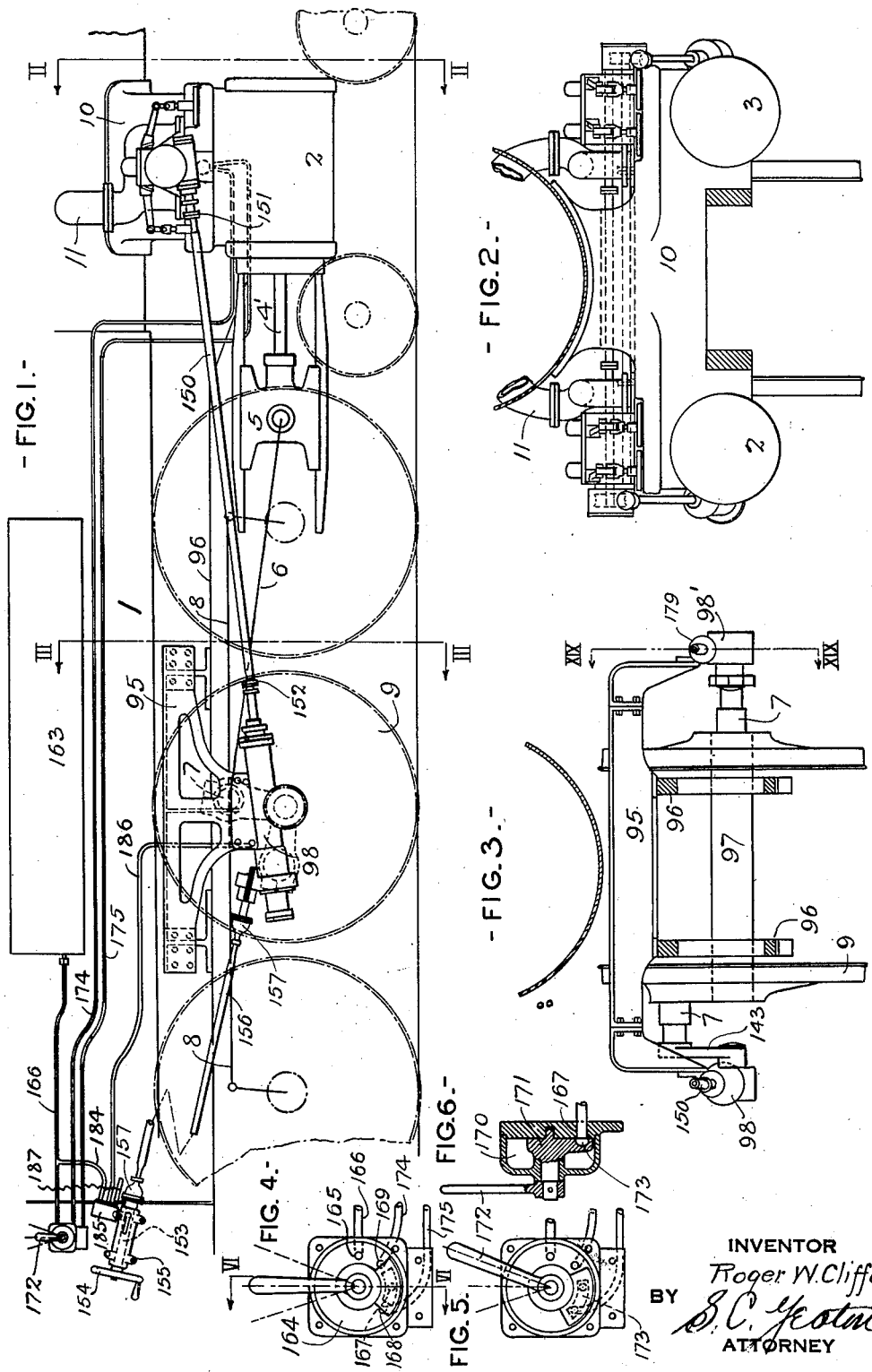
INVENTOR
Roger W. Clifford
BY
S. C. Yeaton
ATTORNEY

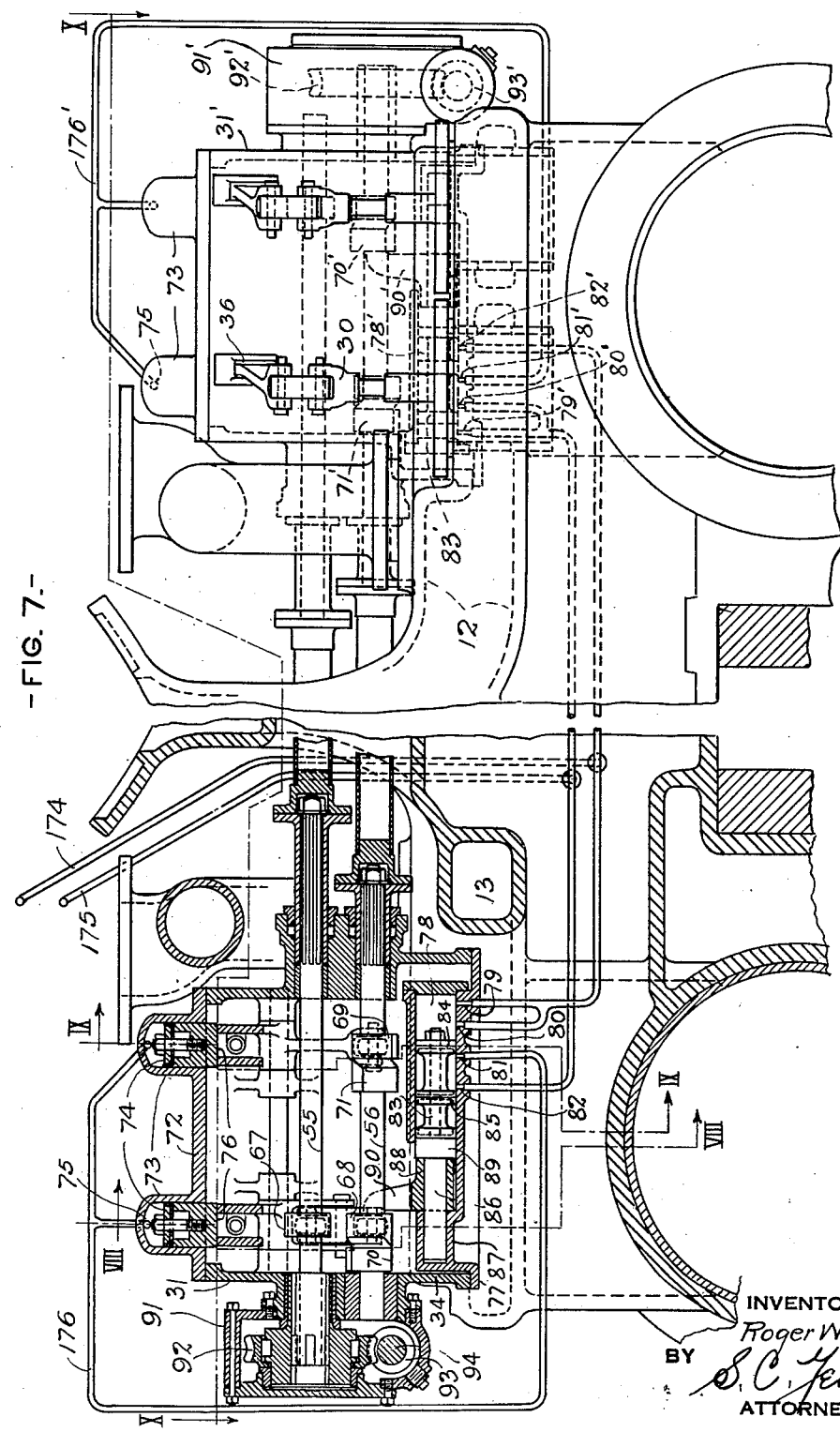

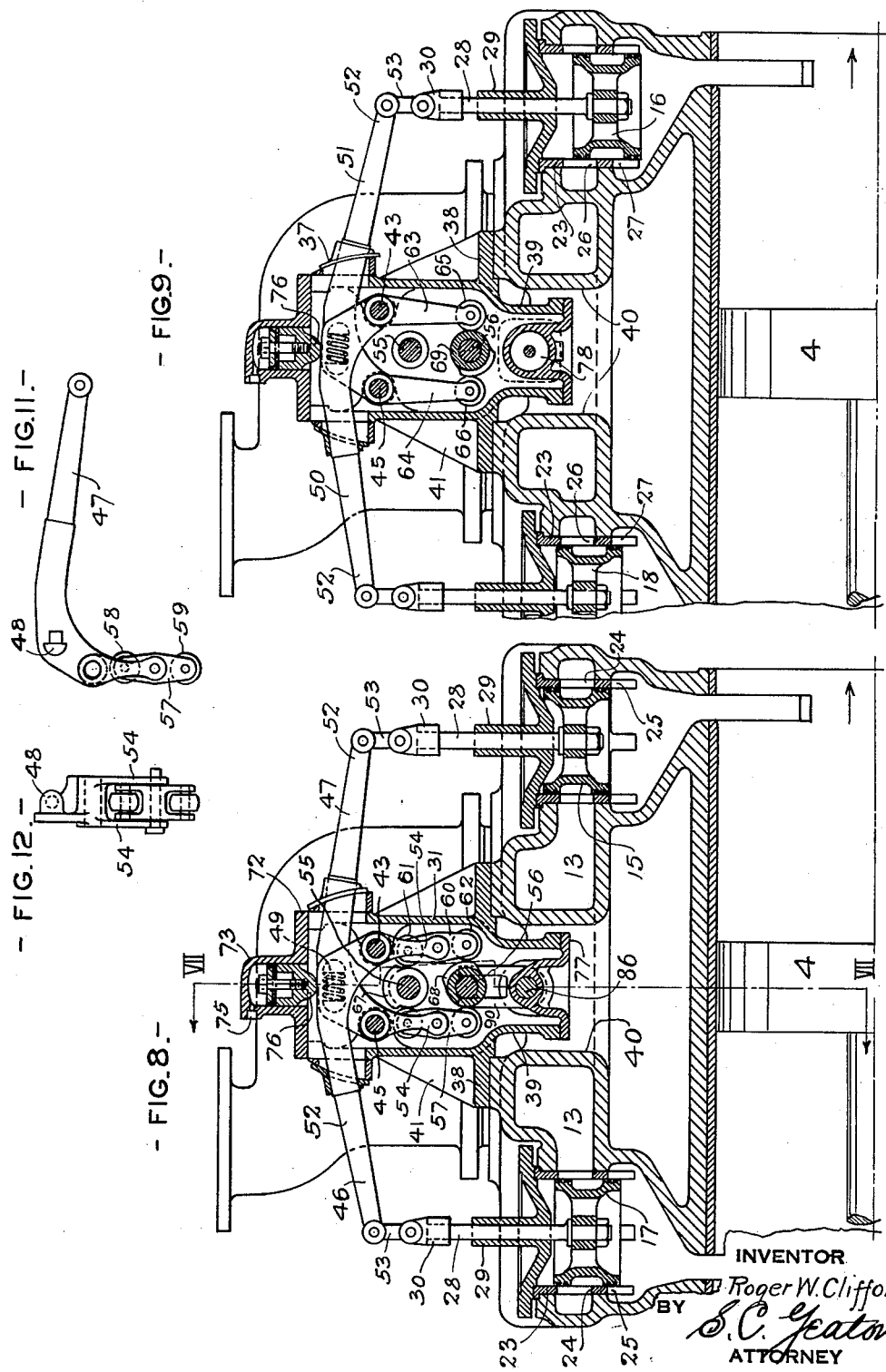

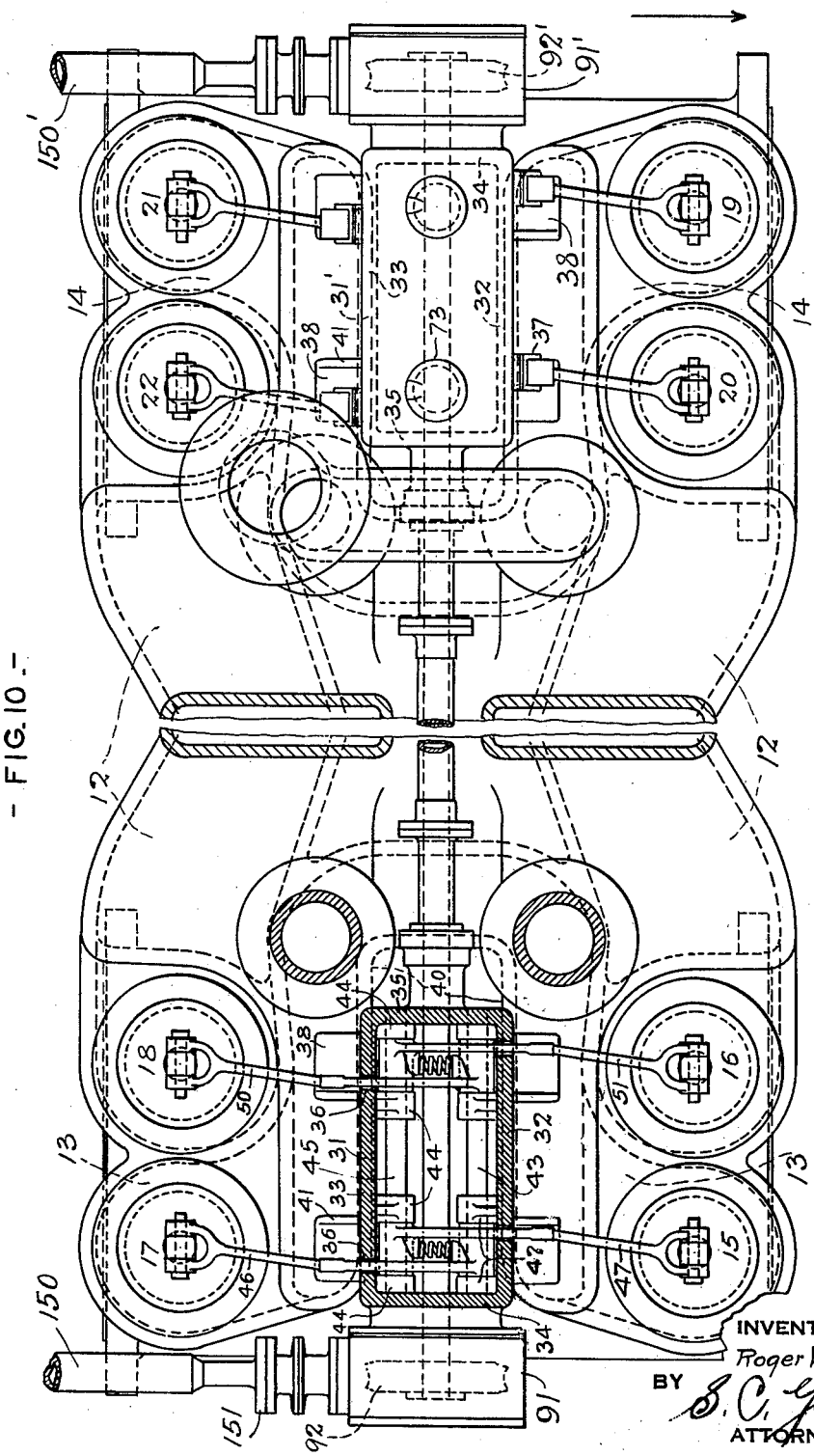

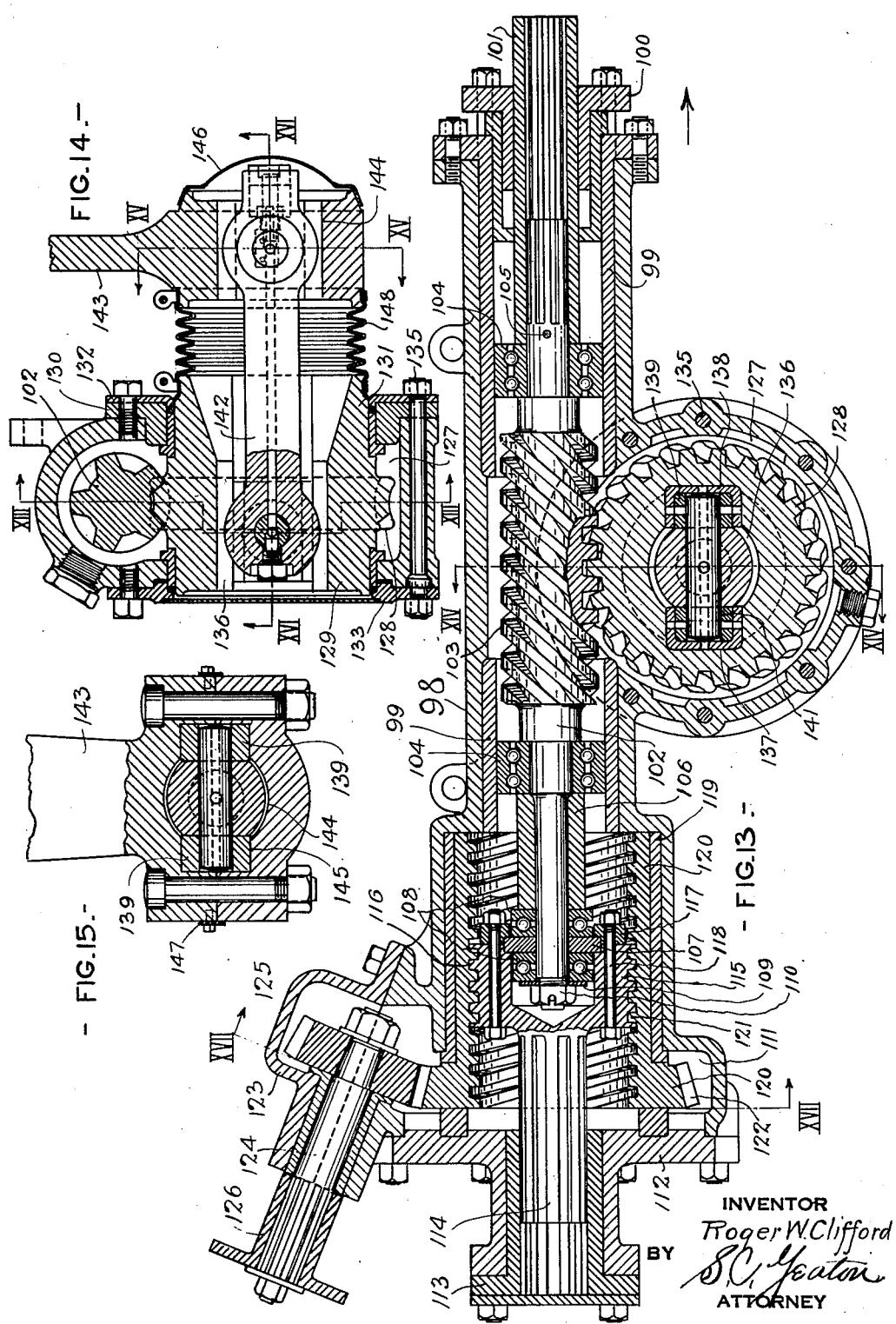

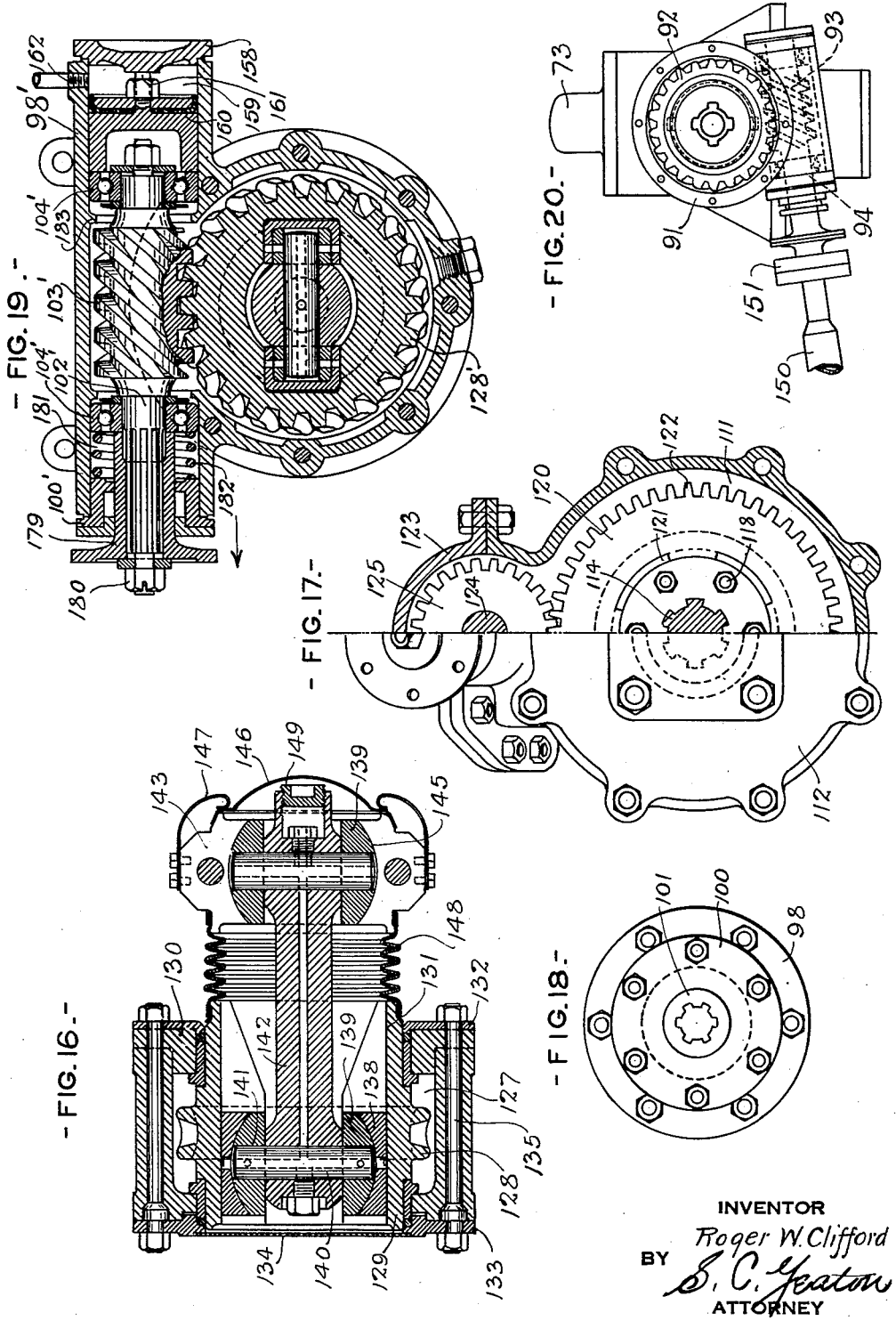

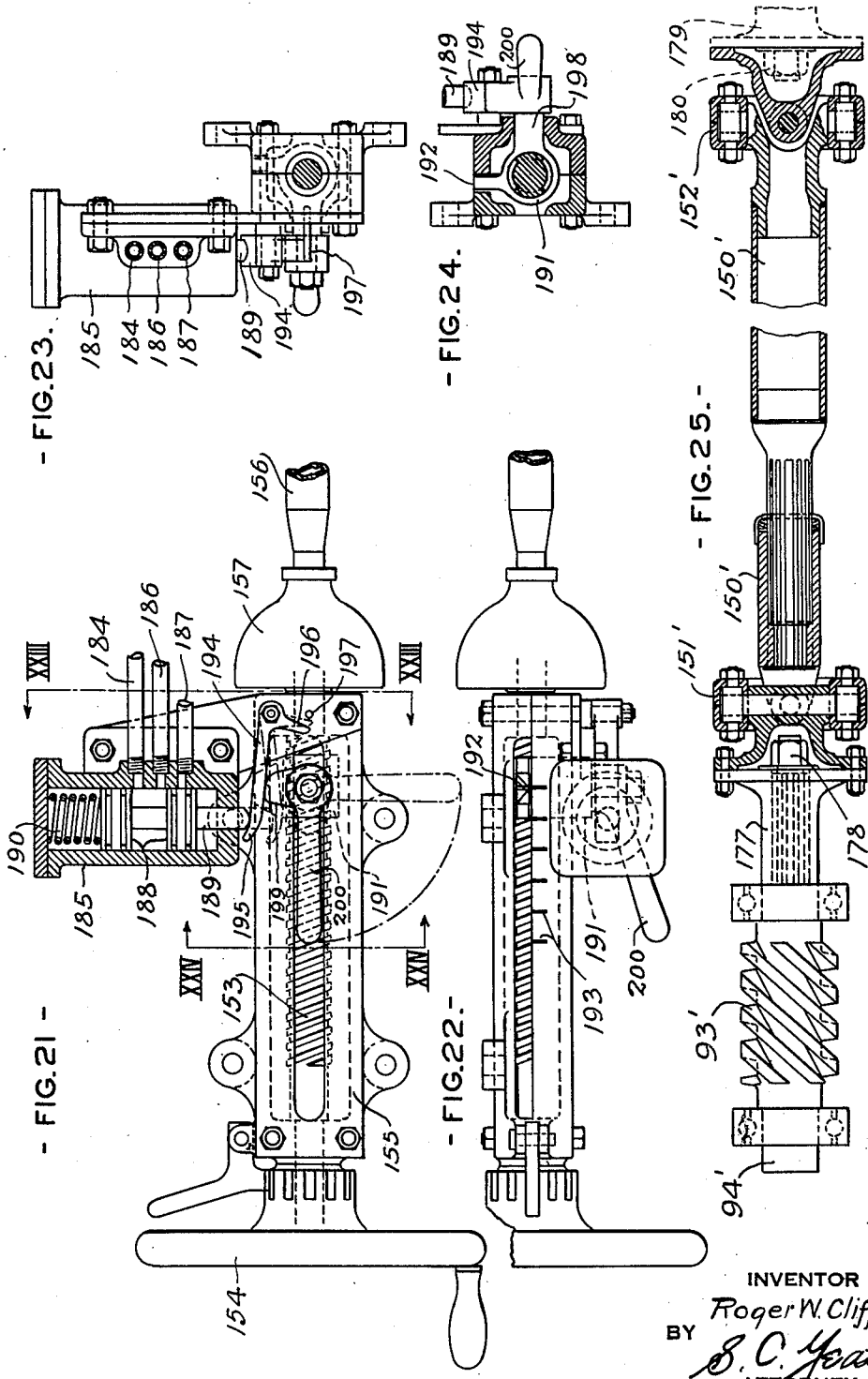

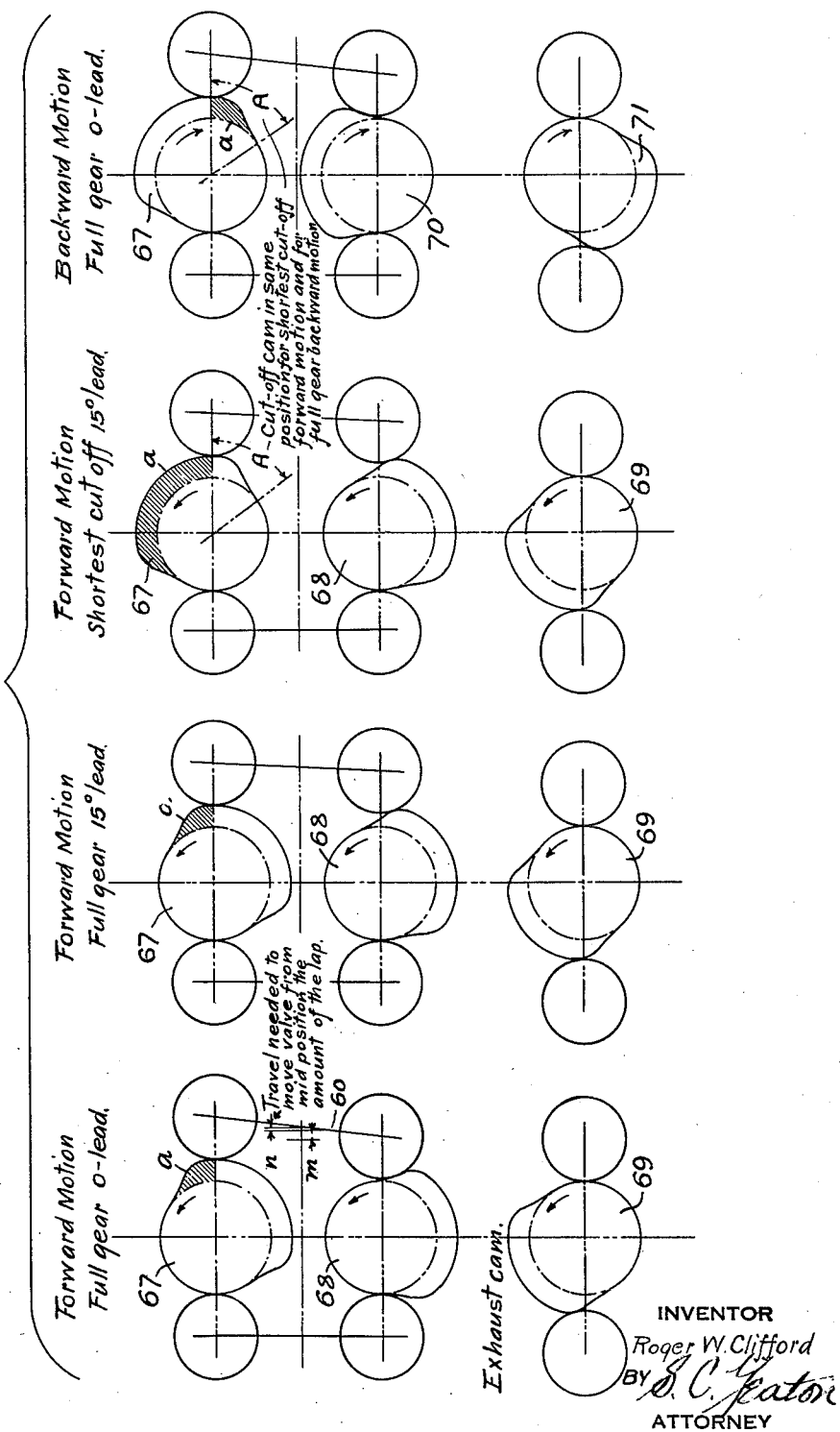

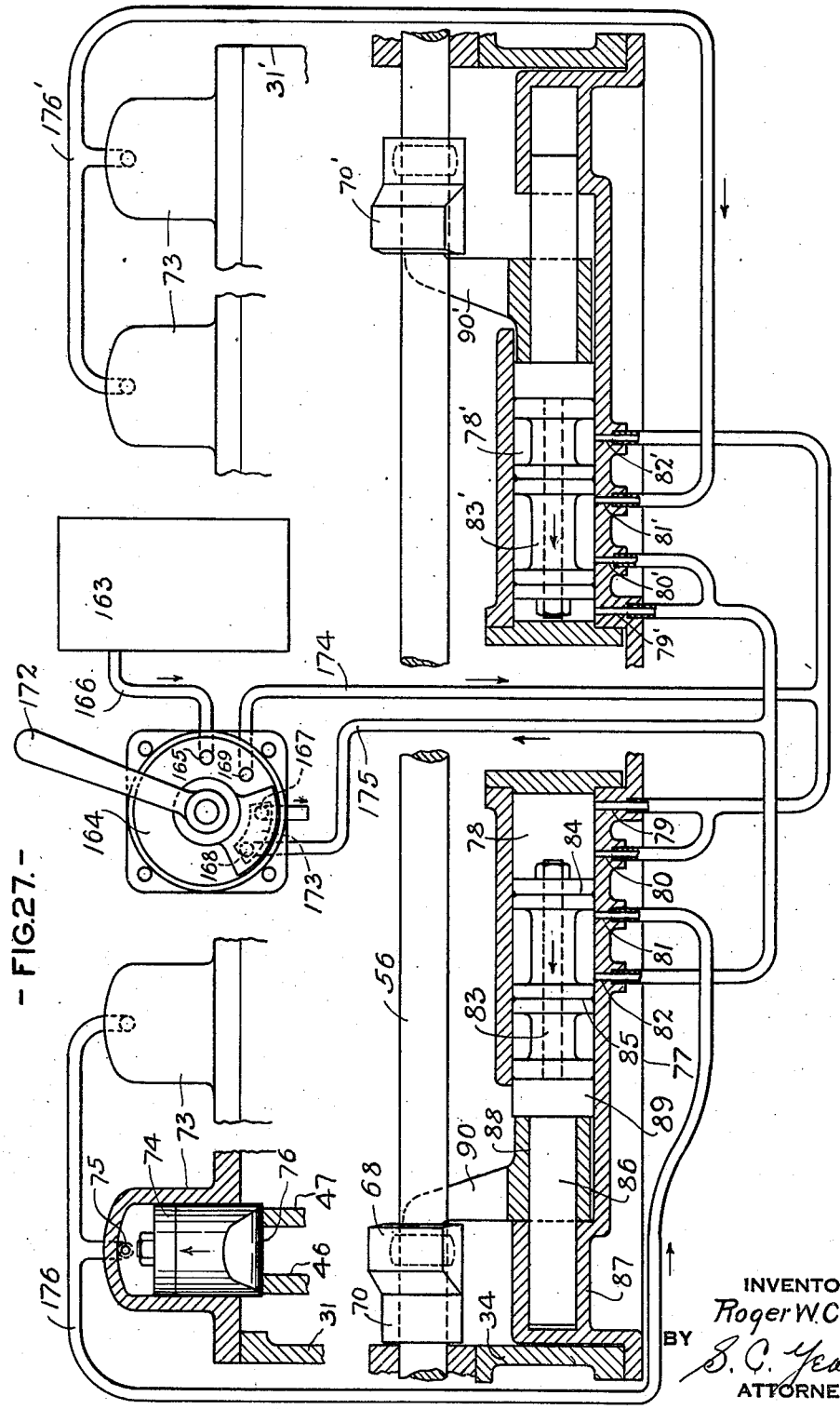

Patented Nov. 1, 1938

2,135,032

UNITED STATES PATENT OFFICE 2,135,032

VALVE GEAR FOR DISTRIBUTION VALVES OF STEAM LOCOMOTIVES

Roger W. Clifford, Schenectady, N. Y., assignor to American Locomotive Company, New York, N. Y., a corporation of New York Application May 20, 1937, Serial No. 143,667

15 Claims. (Cl. 121—127)

This invention relates to valve gear for distribution valves of steam locomotives, and more particularly to that type of valve gear for the valves of power cylinders wherein each cylinder at each end thereof has a valve for controlling the admission events and another valve for controlling the exhaust.

The principal object of the invention is the devising of means for controlling the eight valves of a two power cylinder locomotive by cams and cam engaging elements involving two cam shafts and a minimum number of cams.

A further object of the invention comprises the employment of one of the cam shafts as an admission and exhaust shaft and the other cam shaft as a cut-off shaft.

A further object of the invention is to provide means for axially moving the admission and exhaust cam shaft to effect reversing of the locomotive.

A further object of the invention is to provide means for partially rotating the admission and exhaust shaft relative to the driving axles to vary the preadmission event, the exhaust event being appropriately adjusted therewith.

A further object of the invention is to provide means for partially rotating the cut-off shaft relative to the admission and exhaust shaft and the driving axles to vary the cut-off events.

A further object of the invention is to provide operating mechanism for rotating the admission and exhaust shaft located at one side of the locomotive and other operating mechanism for rotating the cut-off shaft located at the other side of the locomotive.

A further object of the invention is to provide the aforesaid mechanisms for connection with a driving axle or axles, each mechanism comprising a shaft and worm and worm gear drives at each end thereof, one of said drives being connected with the driving axle and the other of said drives being connected with the respective cam shaft.

A further object of the invention is to effect reversing of said locomotive through the cooperation of means operated by fluid under pressure.

A further object of the invention is to provide means whereby the reversal of the locomotive, the changing of the points of cut-off and the adjustment of the preadmission are under the control of the engineer in the cab.

A further object of the invention is the devising of means whereby the distribution valves are positively moved in one direction to open their ports and are automatically moved in the opposite direction to close their ports.

Other objects of and advantages achieved by this invention will be apparent from the following description thereof and the claims appended hereto.

The invention is illustrated in the accompanying drawings wherein Figure 1 is a diagrammatic fragmental side elevation of a locomotive embodying the present invention; Fig. 2 is a section on the line II—II of Fig. 1; Fig. 3 is a section on the line III—III of Fig. 1; Figs. 4 to 6 are enlarged views of a hand operated compressed air control valve, Fig. 4 being a front elevation of the valve with the operating handle in central neutral position and the cover removed, Fig. 5 a similar view with the handle swung to the right (forward) for forward motion of the locomotive, and Fig. 6 is a section of the valve on the line VI—VI of Fig. 4; Fig. 7 is a fragmental view of a part of the locomotive of Fig. 1 enlarged, the central portion being removed and the side portions contracted to save space, the right hand portion being a front end view at the left hand side of the locomotive, and the left hand portion a section at the right hand side of the locomotive, on the irregular line VII—VII of Fig. 8; Fig. 8 is a fragmental view partly in section on the irregular line VIII—VIII of Fig. 7; Fig. 9 is a fragmental view partly in section on the irregular line IX—IX of Fig. 7; Fig. 10 is a view partly in section on the irregular line X—X of Fig. 7; Figs. 11 and 12 are detail views, Fig. 11 being a side elevation of a valve operating bell crank lever with certain of its associated parts, and Fig. 12 an end view of the bell crank and parts shown in Fig. 11, viewed from the left; Fig. 13 is an enlarged view partly in section on the irregular line XIII—XIII of Fig. 14 showing the rear portion of the drive mechanism on the right hand side of the locomotive for controlling the cut-off cam shaft; Fig. 14 is a section on the line XIV—XIV of Fig. 13, the crank arm drive being broken away; Fig. 15 is a fragmental view, partly in section, on the line XV—XV of Fig. 14; Fig. 16 is a view partly in section on the line XVI—XVI of Fig. 14; Fig. 17, at the left, is a half rear end view of the drive shown in Fig. 13, and at the right, a half sectional view on the irregular line XVII—XVII of Fig. 13; Fig. 18 is an end view of the forward end portion of the drive shown in Fig. 13; Fig. 19 is an enlarged view partly in section on the line XIX—XIX of Fig. 3, showing the rear portion of the drive mechanism on the left hand side of the locomotive for controlling the admission and exhaust cam shaft, the left hand end being the forward end of the drive; Fig. 20 is a side elevation (certain parts being removed) showing the forward portion of the cut-off cam shaft drive, the housings for this portion of the drive, the end portion of the cam shaft adjacent thereto and certain associated parts; Fig. 21 is a side elevation, partly in section and partly in dot and dash lines, of the hand controlled device located in the cab shown in Fig. 1 for varying the cut-off and pre-admission; Fig. 22 is a plan of the device shown in Fig. 21, the hand wheel being partly broken away; Fig. 23 is a section on the line XXVIII—XXVIII of Fig. 21; Fig. 24 is a fragmental section on the line XXIV—XXIV of Fig. 21; Fig. 25 is a broken view, partly in section, of the drive shaft and parts connected thereto on the left side of the locomotive for the admission and exhaust cam shaft; Fig. 26 is a diagram of various positions of the cams; and Fig. 27 is a diagrammatic view, partly in section and on an enlarged scale, showing the mechanism and control for reversing the engine.

The locomotive shown, indicated generally by the numeral 1, is of a conventional type and comprises a power cylinder 2 on the right side and a power cylinder 3 on the left side having pistons 4, piston rods 4', crossheads 5, main rods 6, main crank pins 7, side rods 8, center driving wheels 9, a cylinder saddle 10, steam supply pipes 11 and exhaust pipes 12 for the cylinders, a valve chest 13 at the right side of the locomotive and a valve chest 14 at the left side of the locomotive.

The valve chest 13 contains four piston valves, namely an admission valve 15 and an exhaust valve 16 at the forward end of the cylinder 2, and an admission valve 17 and an exhaust valve 18 at the rear end of the cylinder 2, the admission valves being at the outer side of the valve chest and the exhaust valves being at the inner side. Correspondingly the valve chest 14 has four piston valves, namely an admission valve 19 and an exhaust valve 20 at the forward end of the cylinder 3 and an admission valve 21 and an exhaust valve 22 at the rear end of the cylinder 3.

These valves reciprocate vertically in valve bushings 23. The valve bushings 23 of the four admision valves have ports 24 communicating with the steam pipes and ports 25 communicating with the cylinders 2 and 3 and the valves operate to control these ports in the usual manner for admitting live steam to the cylinders and for cutting it off. The valve bushings 23 for the four exhaust valves have ports 26 communicating with the exhaust pipes 12 and ports 27 communicating with the cylinders 2 and 3. The exhaust valves reciprocate in their bushings 23 to control these ports in the usual manner for releasing the exhaust steam in the cylinders to the exhaust pipes. Each of the eight valves has a vertical valve stem 28 which passes through a guide 29 formed in its valve chest, to the exterior. On the outer end of each valve stem is a cap 30 for a purpose later to be described.

On top of the valve chests 13 and 14 are disposed respectively similar housings 31 and 31'. These housings extend transversely of and are disposed over the center portion of the cylinders and are in alignment with each other. Each housing has a front wall 32 and a rear wall 33, integrally connected by an outer wall 34 and an inner wall 35. The front and rear walls have each two openings 36 in its upper portion and sliding covers 37 fit over these openings to move relative thereto to prevent entrance of foreign material therethrough. Each of these front and rear walls also has two horizontal lugs 38 engaging and connected to the valve chest, providing means for connecting the housings 31 and 31' to and supporting them on the valve chests. The walls 32 and 33 are directed toward each other at the lower portion, providing a narrow portion 39 below the lugs 38 and projecting within the valve chests in suitable openings 40, the housings providing a tight fit about the walls of these openings. Reinforcing webs 41 strengthen the walls of the housings. The housings at the lower portions are made fluid tight and filled with oil to a height suitable to lubricate the working parts therein.

The mechanisms within the two housings are similar. Therefore a description of that on the right hand side of the locomotive will suffice and as to that on the left hand side of the locomotive, similar parts (when noted) are denoted by similar numerals with an accent added.

Referring to the housing 31, bearings 42 are formed on the inside of the front wall 32 and a shaft 43 is mounted therein. Bearings 44 are formed on the inside of the rear wall 33 and a shaft 45 is mounted therein opposite the shaft 43 and in spaced relation therewith. A bell crank 46 is freely mounted on shaft 43 and projects rearwardly through one of the openings 36 and extends to admission valve 17. A bell crank 47 is freely mounted on shaft 45 and projects forwardly through another opening 36 and extends to admission valve 15. In this position the shorter arms extend downwardly from the shafts thereby requiring the bell cranks to be crossed in order that the upwardly applied differential of steam pressure (applied upon the bottom of the valve stem and tending to close the valves) will operate to maintain the cam rollers in yielding pressed engagement with their respective cams (later to be described).

Lugs 48 are provided between the bell cranks above the shafts and at equal distances from the center line between the shafts, one lug being formed on each bell crank on the same side of the center line as its shaft. A spring 49 is compressed between and seated on the lugs 48, thereby exerting pressure on each bell crank, cooperating with the aforesaid steam pressure upon the valve stems to raise the valves to closed positions at periods timed by the cams and to maintain the aforesaid engagement of the cam rollers with their cams as will later more fully appear. The spring also functions in a similar manner as to its effect upon said cam rollers and operates to prevent displacement of the valves when the steam has been cut off from the steam chest. Other bell cranks 50 and 51 similar in the main to bell cranks 46 and 47 and provided with lugs 48 and a spring 49 similar to those already described are also freely mounted on shafts 43 and 45, and extend through openings 36 respectively to exhaust valves 18 and 16. Thus the four bell cranks are placed in the upper portion of the housings so that the openings through which each projects will be well above the upper surface of the oil, and each bell crank extends through one of the covers 37.

Each of the four bell cranks has an arm 52 which is pivotally connected by a link 53 to the cap 30 on the valve to which it extends. The spring 49, the pivotal connections of the fulcrums of the levers acted upon by the spring and the valve stems with which the levers are pivotally connected, are all in the same vertical longitudinal plane as can be seen in the partial sectional view of Fig. 10. Each bell crank 46 and 47 also has a bifurcated arm 54 extending downwardly opposite cam shafts 55 and 56. A lever 57 is pivotally connected at its center in the bifurcation of the arm 54 of bell crank 47. Each end of lever 57 is bifurcated and cam rollers 58 and 59 are pivotally mounted in these bifurcations. In a similar manner, bell crank 46 supports a lever 60 having cam rollers 61 and 62. The bell cranks 50 and 51 each respectively have a bifurcated arm 63 and 64 in which bifurcation is respectively mounted a cam roller 65 and a cam roller 66.

A cut-off cam 67 (working in forward and reverse) is secured on the cam shaft 55 and engages the rollers 58 and 61. An admission cam 68 is secured on cam shaft 56 (which shaft, as will later be seen, is adjustable in an axial direction) and the cam is adapted, when the shaft is suitably adjusted, to engage rollers 59 and 62. An exhaust cam 69 also secured on cam shaft 56 engages rollers 65 and 66 when the shaft 56 is suitably adjusted. Cams 68 and 69 are for forward motion. Reverse admission cam 70 is secured on shaft 56 adjacent admission cam 68 and reverse exhaust cam 71 is also secured on shaft 56 adjacent exhaust cam 69, cams 70 and 71 being adapted to be moved to engage the appropriate rollers to effect reverse motion of the engine when shaft 56 is suitably adjusted.

The top wall 72 of the housing 31 is formed with two cylinders 73 in each of which is disposed a piston 74. An orifice 75 in each cylinder permits compressed air to enter the cylinder 73 above the piston to force the piston 74 downward when the air is applied. The bottom of each piston is formed with a rounded abutment 76. The abutment 76 of one of the pistons rests upon the bell cranks 46 and 47 and the abutment 76 of the other of the pistons rests upon the bell cranks 50 and 51 at positions respectively on the center line between the shafts upon which the bell cranks are mounted to move the bell cranks in a manner and for a purpose later to be described.

The bottom wall 77 of the housing 31 extends upward to form a cylinder 78, the wall of which contains ports 79, 80, 81 and 82. A valve piston 83, having two spaced portions 84 and 85 for controlling the ports, the space between the portions connecting the ports in a manner later to be described, reciprocates in the cylinder 78. A valve stem 86 attached to the outer end of the valve piston is disposed in a valve stem guide 87. A sleeve 88 is carried by the valve stem 86 adjacent, at its inner end, an enlargement 89 of the valve stem, and a bifurcated finger 90 projects upwardly from the sleeve through an elongated slot formed in the cylinder, the upper end of the finger 90 having a branch on either side of the cam shaft 56 adapted to engage admission cam 68 at its inner side. The housing 31' is provided with a similar cylinder 78' and associated parts except that the cylinder and parts are oppositely directed so that the finger 90' engages the inner side of the reverse cam 70'.

Secured on the outer wall 34 of the housing 31 is a casing 91 into which an end of the cam shaft 55 extends. A worm gear 92 is splined upon this end of the shaft within the casing and engages a worm 93 disposed within the casing. The worm 93 is formed on a shaft 94 journalled in the walls of the casing in a manner to prevent axial movement of the worm and extends through the rear wall thereof. A similar construction involving worm 93' and a worm gear 92' is provided on the left side of the locomotive, the worm gear 92' being splined to lower cam shaft 56, and the casing 91' on the left side thus being disposed lower than the casing 91. Furthermore the worm gear 92' is mounted similar to the worm gear 92 to prevent any axial movement thereof while the shaft 56 is splined to the worm gear 92' to permit independent axial movement of the shaft 56 relative to the worm gear 92'. It should be here noted that each of the shafts extends entirely across the locomotive, the shaft 55 extending into the casing 91 as aforesaid while the shaft 56 terminates short of this casing, and contrariwise, the shaft 56 extends into the casing 91' and the shaft 55 terminates short of this casing. The shafts are journalled in the side walls of the housings 31 and 31'.

Referring to Figs. 1 and 13, it will be seen that a bracket 95 is supported on the side frames 96 over the axle 97 of the center driving wheels 9. A casing 98 is supported on the right side of the locomotive by this bracket 95. Two bushings 99 are disposed in the casing 98. At the forward end of the casing 98 is secured a two-piece stuffing box 100 through which a hollow section 101 of a shaft 102 projects. On the shaft 102 is formed a worm 103, at either end of which is disposed a ball bearing 104. The forward end of the shaft 102 is splined to the hollow section 101 and a pin 105 secures the shaft section to the shaft proper. The inner raceway of the forward ball bearing is secured on the shaft between a shoulder formed thereon and the rear end of the shaft section 101 and the inner raceway of the rear ball bearing is secured between a shoulder formed on the shaft and the forward end of a spacing sleeve 106 mounted on the shaft. The outer raceways are fitted to their respective bushings 99 to permit them to slide relative thereto.

A collar 107 is freely mounted on the rear end portion of the shaft 102 between ball thrust bearings 108, the forward bearing being adjacent the rear end of the sleeve 106 and the rear bearing being adjacent a retaining washer 109 secured on the shaft by a nut 110. The rear end portion of the casing 98 in which the collar 107 is located is enlarged to form a chamber 111 open at the top and rear. The rear of the chamber is closed by a head 112 bolted to the casing 98 having a rearwardly extending hollow portion in which is secured a sleeve 113 closed at its rear end. A shaft 114 is splined at its rear end portion in the sleeve 113 to permit longitudinal movement relative to the sleeve and casing and to prevent rotative movement, and has an enlarged forward end portion 115. This enlarged portion 115 has formed upon its outer surface threads 116, is formed hollow and at its forward end is provided with a shoulder which abuts the outer margin of the rear face of the collar 107, the rear thrust raceway being housed in the hollow. An apertured disc 117 is mounted on the forward thrust bearing adjacent the forward end of the enlarged portion 115 overlapping the outer margin of the collar 107, thereby securing the collar to the shaft 114 and is securely bolted to the enlarged portion 115 by bolts 118.

A bushing 119 is disposed in the chamber 111 in which is mounted a gear 120 provided with internal threads 121 engaging the threads 116 and external bevel teeth 122 formed on its rear end portion. The gear 120 is mounted in the bushing to permit free rotation of the gear but is mounted in the casing to prevent axial movement.

On the top of the casing 98 above the chamber 111 is provided a two part casing 123 in the rear wall of which is journalled a shaft 124. The forward end of this shaft extends within the casing 123 and has secured thereon a bevel gear 125, the teeth of which engage the teeth 122 of gear 120, the casing 123 having an opening in its bottom wall registering with the aforesaid top opening in the chamber 111 to permit of said engagement. The rear end of the shaft 124 extends beyond the casing and has secured thereto a coupling flange 126.

The casing 98 is extended downwardly forming a chamber 127 in which is housed a worm gear 128 which extends into the casing proper in engagement with the worm 103. To facilitate assemblage the outer end of the chamber 127 is open and is provided with an inwardly extending flange in which is secured a bushing in which is mounted a hub 129 formed on the outer side of the worm gear 128. The inner end of the chamber 127 is also open but the flange is eliminated at this end to facilitate assembling the gear 128 within the chamber, and instead of the flange a flanged ring 130 is provided having a bushing secured to the ring within which an inner hub 131 of the gear 128 is mounted. The hubs are enlarged adjacent the gear proper to abut the adjacent ends of the respective bushings to prevent axial movement of the gear 128. A washer 132 is mounted on the inner end of the gear 128 adjacent the flanged ring 130, and packing is disposed between this washer and the adjacent end of the bushing of the ring. The outer end of the chamber 127 is closed by a ring 133 to which is secured a disc 134, packing being provided between the ring 133 and the adjacent end of the flange bushing. The rings 130 and 133 and washer 132 are secured to the chamber by bolts 135.

The gear 128 is formed with a concentric cylindrical bore 136 at its outer end portion which flares at its inner end toward the inner end of the gear to provide for clearance as will later appear. The cylindrical bore 136 is provided with diametrically opposed grooves 137 which extend in an axial direction through the flaring portion, and blocks or shoes 138 are disposed within the outer portion of the grooves for longitudinal sliding movement therein. The blocks are slotted longitudinally in their opposed faces and the bottom of each slot is formed with a concave cylindrical face, the faces having a common axis at right angles to the axis of the gear 128. A block 139 is disposed in each slot and each block 139 is provided with a convex cylindrical face seating upon and complementary to the concave cylindrical face of the slot. The blocks 139 have opposed spaced flat faces opposite their respective convex cylindrical faces and are connected by a cylindrical pin 140 mounted at its opposite ends in bores 141 provided in the respective adjacent blocks 139. A bar 142 is mounted at the outer end on the pin 140 and is formed spherical at this end to permit it to have angular movement within the cylindrical bore of the gear and is flattened at opposite sides to provide flat faces opposite the adjacent flat faces of the blocks 139.

In view of the manner of connecting the bar as afore-described with the gear, it will rotate with this gear, move axially of the gear and swing from its outer end about both the axis of the pin and the axis of the cylindrical faces of the seats in the blocks 138.

Upon the end of the main crank pin 7 on the right side of the locomotive is secured an arm 143 which extends therefrom in a radial direction toward the axis of the main driving axle 97. This end of the arm is provided with a cylindrical bore 144 (see Figs. 14–16) having its axis coincident with the axis of the driving wheel 9, and it should be here remarked that normally the axis of the gear 128 is also coincident with the axis of the driving wheel 9. The bar 142 is mounted at its inner end in the bore 144, and the connection of the bar at this end is in the main similar to the connection at the outer end, except that at this inner end the bar has no axial movement relative to the arm 143 and therefore instead of the blocks or shoes 138 slots 145 are formed in the bore 144 with cylindrical bottoms and the blocks 139 are disposed in these slots. It will thus be seen that as the driving wheel revolves it will revolve the bar 142 at the same speed and the bar will revolve the gear 128 also at the same speed. Furthermore it will be noted that due to the flexible connection of the bar with the arm 143 and gear 128 any vertical or angular movement of the driving wheel 9 relative to the locomotive frame 96 to which the casing 98 is rigidly connected will not affect the gear 128. The end of the arm 143 is made in two parts bolted together. The inner open side of this end is closed by a cover 146, held in place by clips 147 rendering it easily removable when occasion requires, and the outer open side is connected to the inner open end of the hub 131 by a bellows-like closure 148. The bar 142 and its associated parts are thus entirely inclosed to permit proper lubrication and exclusion of foreign material. Passageways for lubricant are provided in the bar, pins and blocks as shown in Fig. 16, in a manner to lubricate all working parts within the inclosure. The lubricant is supplied from the inner end of the bar 142, a cavity being provided at this end closed by an adjustable screw plug 149 which must be removed together with the cover 146 when lubricant is supplied.

The worm gear 128 as it revolves drives the worm 103 and shaft 102 on which the worm is formed. A shaft 150 connects the two shafts 102 and 94, the three shafts constituting in effect but one shaft, whereby, through the mechanism already described, the cut-off cam shaft 55 is revolved by the driving wheel 9. The shaft 150 is connected to the shaft 94 by a universal joint 151 and the shaft 150 is made in two parts connected by a similar universal joint 152, providing a flexible shaft connection between the worms 103 and 93. These universal joints are of a well-known type. The rearward part of the shaft 150 is relatively short and splined at its rear end portion which extends into the hollow section 101 of the shaft 102 in splined connection therewith for rotation thereby while permitting the worm 103 to move axially relative thereto.

A shaft 153, provided at its rear end with a hand wheel 154, is journalled in a housing 155 secured to the locomotive within the cab. A shaft 156 is connected to the shafts 153 and 124 by universal joints 157 of usual construction, the three shafts constituting in effect a single shaft providing a flexible shaft connection between the hand wheel 154 and the bevel gear 125 whereby the bevel gear 125 may be rotated in either direction by the hand wheel 154. The hand wheel 154 is for the purpose of adjusting the point of cut-off as will later more fully appear.

The shaft 153 and housing 155 are merely indicated in Fig. 1. They form parts of a device of well-known construction involving indicator means for indicating the points of cut-off for both forward and reverse motions, a valve for compressed air and means for controlling the valve, all of which are later more fully described and are more particularly shown in Figs. 21–24.

Except as to features presently noted, the admission cam shaft 56, which is driven from its end at the left side of the locomotive and from the main driving wheel 9 on that side of the locomotive, is revolved by mechanism similar to that already described in connection with the cut-off cam shaft 55, and therefore similar parts are noted by similar numerals with accents added. The only parts of this mechanism shown in detail are those shown in Fig. 19. A comparison of this mechanism with that shown in Fig. 13 will clearly show the difference between the two cam shaft drives, it being borne in mind that in Fig. 19 the forward end is at the left while in Fig. 13 the forward end is at the right, as indicated by arrows in each instance. The mechanism of Fig. 13 to the rear (left) of the rear ball bearing 104 is for varying the cut-off, the rotation of the shaft 102 independent of the rotation of the driving wheel 9 effecting such variations as will later be seen. The shaft 102' has no such function and therefore terminates at its rear (right) ball bearing 104'. The casing 98' is however, continued rearwardly and is provided with a head 158 providing an air cylinder 159 in which operates a piston 160. This piston is for the purpose of altering the preadmission, release and closure, as will later be seen. The piston is provided with packing which is held in place by a stud 161 formed on the piston 160, the outer end of which bears against the head 158, serving as a stop for the piston, when the air is removed, and a port 162 for a compressed air supply pipe is provided in the wall of the cylinder between the head and piston.

While, as already remarked, the driving connection at the driving wheel 9 on the left side of the locomotive for the admission cam shaft 56 is, except for certain differences, some of which have already been mentioned, substantially like the drive on the right side of the locomotive, and while Fig. 19 is the only figure showing details of this drive on the left side of the locomotive, it will be understood however that the mechanism and its associated parts connecting the worm gear 128' with its driving wheel crank 7 is substantially similar to that shown in Figs. 14–16. Also the mechanism at the forward end of the driving shaft at the left side of the locomotive is substantially similar to that shown in Fig. 20, the driving shaft on the left side being similar to the driving shaft on the right side of the locomotive in that they are both provided with flexible joints to render them flexible. The shaft on the left side however is otherwise somewhat different, as will later more fully appear.

An air supply reservoir 163 is secured upon the right side of the locomotive for supplying compressed air to the ports of the cylinders 73 and 78', ports of the four cylinders 73 and to the port of the cylinder 159. These ports, with the exception of the port of cylinder 159, are controlled by a valve 164 disposed in the cab (best seen in Figs. 4–6). It comprises an air admission port 165 connected by pipe 166 to the reservoir 163, an exhaust port 167 leading to the atmosphere, a port 168 at one side of the exhaust port, and another port 169 at the other side of the exhaust port, said ports 168 and 169 leading to the said various air ports. The valve 164 is provided with a compressed air receiving chamber 170 into which the said ports of the valve open and in which is a valve element 171 for controlling said valve ports rotated by the hand lever 172. The valve element is provided with an arcuate chamber 173. The valve element when suitably rotated will cut out either of the ports 168 or 169 from the chamber 170 and will connect the cut-out port with the exhaust port through the chamber 173, so that one of the ports 168—169 will be supplying air from the chamber 170 while the other port will be exhausting used air to the atmosphere.

The valve element is extended at each side of the arcuate chamber 173 to half cover the ports 168 and 169 (as shown in Fig. 4) when the valve element is in mid position which is denoted by central position of the hand lever.

A pipe 174 having suitable branches connects the port 169 with ports 79, 80 and 82'. A pipe 175 having suitable branches connects the port 168 with ports 82, 79' and 80'. A pipe 176 having suitable branches connects the port 81 with the two orifices 75 and a similar pipe 176' connects the port 81' with two similar orifices 75.

The operation of the valve gear, as thus far described, is as follows: When the locomotive is at a standstill or drifting, the control lever 172 is in mid position, as shown in Fig. 4, thereby partly opening both the ports 168 and 169 to the supply chamber 170. Live compressed air is thus fed to both the cylinders 78 and 78' and compressed air is being fed to the pipes 176 and 176'. The pistons 74 in the four cylinders 73 are accordingly forced downward which operates to swing the levers about their shafts (fulcrums), the cam rollers are thus moved away from the cams (leaving the cams when they revolve ineffective) and the admission and exhaust valves are lowered to open positions. The main throttle is closed and the power cylinders open at both ends to atmosphere. The pistons 83 and 83' in these cylinders are, for convenience of illustration, shown in Figs. 7 and 27 in positions for forward motion of the locomotive, and the pistons 74 are in their upper positions, the cylinders having exhausted through the pipe 175.

Similar conditions prevail when the pistons 83 and 83' are in their opposite positions, namely those for reverse movement of the locomotive, the only difference being that the cylinders 73 now exhaust through the pipe 174.

Coming now to the operation of the hand lever for forward motion, it is swung from the position shown in Fig. 4 to the right to the position shown in Figs. 5 and 27. The drawings show the parts arranged for forward position, but for a clearer understanding of how the parts are moved to their proper positions for forward motion, let it be assumed that the pistons 83 and 83' are in their reversed positions and consequently the admission cam shaft 56 in its reverse position with the reverse cams 70, 70', 71 and 71' in engagement with the respective cam rollers and the other cams (for forward motion) at their positions to the right of the cam rollers as viewed in Fig. 27. In this position for rearward motion of the locomotive the hand lever will be in its position to the left of the center line as indicated in Fig. 4. The ports 81 and 81' will then be in communication with the pipe 174 but as this pipe 174 is then open to the atmosphere the cylinders 73 will have exhausted to the atmosphere and the springs 49 will have operated to swing the bell cranks to bring the cam rollers into engagement with the cams and to move the exhaust and admission valves correspondingly, and to their proper relative positions so that they will operate in predetermined sequence relative to the operation of the pistons of the power cylinders.

To adjust the parts from these positions for reverse movement to positions for forward movement of the locomotive, the hand lever 172 is swung from its position at the left to its position at the right (Figs. 5 and 27). This connects the port 168 with the atmosphere and simultaneously connects the port 169 with chamber 170 for compressed air supply. All ports connected to the pipe 175 thereby exhaust to the atmosphere and all ports connected to the pipe 174 receive compressed air. Bearing in mind that pistons 83 and 83' are at this time at their extreme positions to the right (Fig. 27), the pipes 176 and 176' are supplied with compressed air thereby moving the cam rollers from the cams in the manner already described. The predominating air pressure is then in the cylinder 78 between its head and the end of the piston 83, which results in moving the piston to the left, and likewise the admission cam shaft 56, through the operation of the finger 90 which bears against the adjacent cam 68, the shaft 56 moving in its spline connection with the worm gear 92'.

The piston 83' is simultaneously moved to the left through the operation of the cam 70' engaging the finger 90'. During this movement of the pistons 83 and 83' the compressed air is first cut off from the pipes 176 and 176', the compressed air being then entrapped in these pipes, and finally the pipes 176 and 176' are brought into communication with the pipe 175 which, as already stated, is open to the atmosphere. The compressed air in the cylinders 73 is thus exhausted to the atmosphere whereupon the bell cranks and the cam rollers move to their normal active positions in a manner already described.

The cams for forward movement are thus moved to their engaging positions with their respective cam rollers, but the rollers are not moved to their active positions until the cam shaft has been fully moved to the left, thereby providing a free space between the opposite rollers for free movement of the cams, thus obviating any danger of injury to the cams or rollers which might occur if the rollers were not spread during the shifting of the shaft.

The adjacent forward and reverse admission cams are fixedly secured upon the admission cam shaft 56 and the relative positions of the respective forward ends (i. e., the points of initial admission) of radially extended faces which are provided in the cams will depend upon the lead provided for forward and reverse motions. These points are oppositely disposed and suitably spaced circumferentially so that initial admission will be effected in each instance at corresponding piston events. The faces extend from their respective forward ends circumferentially in opposite directions and are of lengths as best practice will indicate. These faces will be advanced circumferentially to advance the points an amount dependent upon the amount of lead desired in each instance. In an approved embodiment of the invention the reverse admission cam is given no lead and the advance admission cam is given approximately 15 degrees lead.

There is approximately at initial admission by an admission valve for either forward or reverse motion initial exhaust by an exhaust valve at the opposite end of the cylinder. Therefore an exhaust cam operates on the cam roller at the opposite side of the cam shaft from the cam roller operated upon by its corresponding admission cam (there being a forward and a reverse exhaust cam). The forward end (the point for initial exhaust) of the radially extended face provided on the exhaust cam is disposed at 180 degrees from the point for initial admission on the extended face of the corresponding admission cam. The radially extended faces of the forward and reverse exhaust cams extend circumferentially from their respective forward ends in opposite directions, and are of lengths as best practice will indicate, the duration of exhaust being constant.

The gear being now set for forward motion, it can be set for reverse motion by swinging the hand lever from its position at the right (Fig. 5) to its position at the left, and the various parts will be operated and adjusted for reverse movement in a manner that will be obvious from the foregoing without further detailed description.

Considering further the gear set for forward motion, the main driving axle 97 will revolve in a clockwise direction as viewed in Fig. 1 and the cam shafts 55 and 56 will revolve in the opposite direction due to their connections with this main driving axle, the worm gears of each connection engaging their respective worms on opposite sides thereof and the worms and gears of the connection being of the same kind, for instance all left hand as shown in the drawings. The gears which transmit the motion of the driving axle to the cam shafts are proportioned to impart the same angular movement to the cam shafts as that of the driving axle. Therefore the cam shafts will make one complete revolution for each complete revolution of the driving axle or one complete reciprocation of the pistons of the power cylinders, and as the driving of the cam shafts is effected by positive driving connections the admission and exhaust valve operation will be positive, and in view of the angular arrangements of the cams, will open and close in proper timed relation with the events of the pistons.

The extended face of the exhaust cam is of a suitable circumferential length so that when in mid position neither of its cam rollers will be in engagement therewith so that both exhaust ports can not be opened at the same time. Fig. 9 shows this exhaust cam in its position corresponding to the positions of the cams in Fig. 8 which are at positions for cut-off at substantially 50% of the piston travel when moving in its forward stroke.

The forward (advancing) end of the extended face of the exhaust cam is then substantially in the vertical plane of the axis of its cam shaft and the face has travelled in contact with its cam roller through substantially 90 degrees of its travel, i. e., 50% of the piston stroke. The face still has some distance to travel before it disengages its cam roller to close the exhaust port, which determines the amount of further travel of the piston before closure of the exhaust port, which distance is pre-arranged and as aforesaid is determined by the length of the extended surface. It will be observed that when the exhaust cam has travelled substantially 90 degrees further the extended face will engage its opposite cam roller to open the opposite exhaust valve at which time the piston will have arrived substantially at the end of its stroke.

The position of the admission and cut-off cams for controlling the admission valves corresponding to the position of the cam for controlling the exhaust valves as shown in Fig. 9 for forward motion, is best shown in Fig. 8. As here viewed the two cam shafts revolve counterclockwise, as previously stated. Both the admission cam 68 and the cut-off cam 67 have a radially extended cam face and these faces are made of suitable length so that when either is in mid position it is in engagement with neither of its respective cam rollers. Therefore neither of these faces can operate on its respective cam rollers at the same time. When the cam rollers on the same side of the vertical center line of the cam shafts are both out of contact with the faces the valve operated by these rollers is fully closed, as illustrated by the valve at the right, Fig. 8.

Each of the extended cam faces of the cams 67 and 68 operates to move the admission valves through equal amounts, that is to say through movements equal to half the throw of the valve. Therefore assuming that the forward (advancing) end of one face, as for instance the face of the cut-off cam 67 (which is the case in the present illustration of the operation) is in advance of that of the other (that of the admission cam), this advanced face will engage its roller at the right, and assuming that the corresponding admission valve is in closed position, as it will be at this event, this valve will thereby be moved downwardly in an opening direction half the distance of its throw. The parts are so proportioned however that this will only move the valve to a position just prior to its opening similar to its position at cut-off. The valve will remain in this position during contact of this cam face with its roller until the face on the admission cam engages its roller. This will produce a like downward movement which will result in fully opening the admission valve. Thus the forward (advancing) end of this face of the cam 68 determines the point of admission of steam, and accordingly the cam 68 is termed the admission cam. This cam is positioned angularly on its shaft so that admission will take place for this valve when the piston is at the end of its backward stroke, although this angular position of the cam relative to the main crank pin may be slightly varied as will later appear to vary the point of admission, to alter preadmission when desired.

As previously stated, the admission port opening and exhaust port opening events occur substantially simultaneously. The extended exhaust cam face upon engaging its roller will give full port opening and likewise the extended face of the admission cam engaging its roller (the extended face of the cut-off cam being then in engagement with its corresponding roller) will give full port opening. Also the exhaust valve will move from full port opening to closed position upon the exhaust cam extended face leaving its roller and likewise the admission valve will move from full port opening to closed position upon the cut-off cam extended face leaving its roller (the extended face of the admission cam being then in engagement with its corresponding roller). The other exhaust port will be closed as shown at the left in Fig. 9. The exhaust ports are controlled by a single cam (there being no exhaust cam on the cam shaft 55), therefore the exhaust valves do not have what might be called the double movement had by the admission valves, the only movement being from closed position shown at the left, Fig. 9, to full open position shown at the right. In other words these valves do not move from and to positions adjacent their cylinder heads as do the admission valves as shown for instance at the right in Fig. 8.

The extended faces of the cams 67 and 68, so to speak, overlap each other, the extended face of the cam 67 acting first to move the valve at the left (Fig. 8) to a position similar to the position shown where it remains until the extended face of the cam 68 comes into action for admission. The two extended cam faces then act together but they are relatively so positioned that the extended face of the cam 67 leaves its roller first which allows an upward movement of the valve from full port open position to port closed position (cut-off position), the positions of the cams and the valves for cut-off for the valve at the left being shown in Fig. 8, which, as has been stated, in the particular instance are the positions at 50% cut-off. The cam 67 is therefore termed the cut-off cam. The extended face of the cam 68 then continues to act until it leaves its roller whereupon the admission valve moves upwardly to its cylinder head position similar to that shown at the right Fig. 8.

The admission cam will always operate upon each of its cam rollers in a similar manner in relation to the movement of the piston during the corresponding half reciprocation thereof, and similar remarks also apply to the cut-off cam for any cut-off setting thereof. This is true for both forward and reverse movements.

The axial movement of the cam shaft 56 for reversing the gear, shifts the cams 68 and 69 out of alignment with their cam rollers, and places the cams 70 and 71 into alignment.

From the foregoing it will be seen that the angular position of the rear end of the extended face of the cut-off cam 67 relative to the main crank pin determines the point of cut-off and that this relative angular position, and therefore the cut-off, may be varied by rotating the cam shaft 55 relative to the driving axle, the cut-off being lengthened, for forward movement, by a clockwise rotation as viewed in Fig. 8, and shortened by an opposite rotation.

The mechanism for independently rotating this cam shaft has already been described and its operation is as follows:—The hand wheel 154 in the cab is turned clockwise to shorten the cut-off, that is to say to turn the cam shaft 55 in a counterclockwise direction, as viewed in Fig. 8, or in other words to bring the cut-off or rear end of the extended face of the cam 67 nearer to the admission or forward end of the extended face of the cam 68. The extent that the handle is turned will determine the shortness of cut-off, it being understood of course that the two extended faces must always overlap, that is to say the rear end of the extended face of the cut-off cam 67 must always follow the forward end of the extended face of the admission cam 68. When the hand wheel is so turned the bevel gear 125 with which it is connected by shaft 156 will be similarly rotated which will rotate the gear 120 in an opposite direction, and as this gear 120 has no axial movement it will draw its engaging gear 115 rearwardly, this gear having only axial movement due to its spline connection with the sleeve 113.

This rearward movement of the gear 115 will draw the shaft 102 rearwardly with it and this shaft which is mounted in the gear 115 for rotation relative thereto will, due to its engagement with the gear 128, be caused to rotate. The shaft 150, which is splined to the shaft 102 for rotation therewith, but which is held against axial movement, will likewise rotate, which rotation will rotate the worm 93, the direction of rotation of the worm being such as to rotate the engaging worm gear 92 and its cam shaft 55 in a counterclockwise direction thereby effecting a counterclockwise movement of the cut-off cam 67 for shortening the cut-off as aforesaid.

It is obvious that by turning the hand wheel in the opposite direction the reverse movements will be effected, resulting in a lengthening of the cut-off, it being understood that in no instance must the forward end of the extended face of the cut-off cam 67 be moved in lengthening the cut-off to a position to the rear of the forward end of the extended face of the admission cam 68, for then the forward end of the admission cam 68 would cease to effect admission.

It will be understood that for reverse motion cut-offs similar to those for advance motion will be effected by turning the hand wheel to the same extent in the reverse direction. The position of the hand wheel for longest cut-off advance motion will be that for shortest cut-off reverse motion, and instead of shortening the cut-off as the hand wheel is turned from this position for advance motion this turning of the hand wheel will operate to lengthen the cut-off for reverse motion, the shortest cut-off for advance motion being the longest cut-off for reverse motion. Except for the provision for altering the lead or preadmission in forward motion, the operation of the gear for reverse motion is similar to that for forward motion. Also each of the admission valves is operated in a similar manner. Likewise each of the exhaust valves is operated in a similar manner, bearing in mind however the variance in timing of the valves on each side of the locomotive due to the relative angular positions of the main crank pins which follow the usual practice.

It has been previously remarked that provision is made for altering the preadmission or lead. This is for forward movement only at long cut-offs. The forward admission cam 68 is secured upon its shaft, relative to the reverse admission cam, at a somewhat advanced position so that normally it will provide a preadmission or lead. In the present embodiment the reverse admission cam provides no lead. It is desirable that through the range of longer cut-offs for forward motion the lead be reduced preferably to zero.

Provision is made for adjustment of the cam shaft 56 to provide no lead and simultaneously to delay the points of release and closure. This is accomplished by rotating the cam shaft 56 in a clockwise direction, as viewed in Fig. 8, that is to say contrary to its direction of travel (counterclockwise) for forward motion. This is effected by rotating the worm 93' (see Fig. 7) which rotates the worm gear 92' secured on the shaft 56 in a reverse direction to that of its travel for forward motion.

The worm 93' is formed on a shaft 94' (see Fig. 25) which is splined to a flanged sleeve 177, the sleeve being secured against longitudinal movement by a nut 178. This construction is similar to that shown in Fig. 20 for the right side of the locomotive. It is noted, however, that the parts shown in Fig. 25, like those of Fig. 19, are seemingly reversed, that is to say when considering the locomotive as viewed in Fig. 1. Therefore the left hand end is actually forward of the right hand end. This seeming reversal is due to viewing the locomotive, as to Figs. 19 and 25, from the left side.

A shaft 150' is connected to the flange of sleeve 177 by a universal joint 151' and the shaft is made in two sections splined together to permit the right hand section to slide axially relative to the left hand section, the left hand section and parts connected thereto, including the worm 93', being thereby connected for rotation by the right hand section but having no longitudinal movement, the worm 93' being similar in this respect to the worm 93.

The shaft 102' (Fig. 19) has a flanged sleeve 179 splined thereon and secured against longitudinal movement by a nut 180. The casing 98' is closed at this end by a two-piece stuffing box 100' secured by bolts (not shown) and is extended at this end to provide a chamber 181 which houses a helical spring 182 disposed about the sleeve 179 between the inner face of the stuffing box 100' and the adjacent ball bearing 104'. The rear end of the shaft 150' is connected to the flange of the sleeve 179 by a universal joint 152'. By means of the universal joints and spline connection the shaft 150' is rendered both flexible and expansible so that rotation of the worm 103' when made independently of the worm gear 128' will effect axial and rotative movement thereof thereby rotating the worm 93', its worm gear 92' and cam shaft 56. To so operate the worm 103' for clockwise movement of the shaft 56, as viewed in Fig. 8, to reduce the lead, compressed air is admitted to the cylinder 159. The pressure of this air forces the piston 160 and worm 103' to the left, as viewed in Fig. 19, the worm 103' simultaneously turning, due to its engagement with the worm gear 128', in a direction opposite to that for forward movement of the locomotive.

In the present embodiment there is but a single preadmission or lead provided, which is preferably about 15° lead. This requires but a relatively small axial movement of the worm 103' which is determined by the space between a flange 183 formed on the casing 98' and the adjacent ball bearing 104' when in its normal running position. The lead is reduced the full amount when this ball bearing engages the flange, it being understood that the ball bearings 104' and sleeve 179 are so connected with the worm 103' as to move axially therewith as a unit, the piston 160 acting, when under the pressure of the compressed air, against the bearing 104' adjacent thereto. The reduced lead will be maintained so long as the compressed air is held in the cylinder 159. When this compressed air is released the spring 182, which has been compressed by the action of the compressed air, reacts, restoring the worm 103' and its attendant parts to normal positions, that is to say to positions for full lead. During this returning movement the worm 103' rotates in an opposite direction moving toward the right, as viewed in Fig. 19, until the stud 161 strikes the head 158. The spring 182 is of sufficient strength to hold the worm 103' in its returned or normal position to the right against the thrust action of the worm gear 128' when operating for forward motion.

For the spring may be substituted an air-controlled piston similar to that shown at the right, in which case the air operating the two pistons will be controlled so that the pistons will operate alternately as required to effect the desired change in the lead.

The compressed air for the cylinder 159 is controlled in the following manner:—A branch supply pipe 184 leads from the air supply pipe 166 to the upper port in a valve casing 185 (see Figs. 21–24). A pipe 186 leads from a port in the casing below the port of pipe 184 to port 162 in the cylinder 159. A pipe 187 leads from a port beneath the port of pipe 186 to atmosphere. A double-headed piston valve 188 having a stem 189 extending through the bottom of casing 185 is disposed in the casing beneath a spring 190. The valve controls the ports of the three pipes and when in upper position, as shown in Fig. 21, connects the compressed air branch supply pipe 184 with the cylinder 159, and when in lowered position cuts off the air supply and connects the cylinder 159 with atmosphere.

The valve is moved upward against the tension of the spring by force applied to the ends of the stem 189 and is automatically moved downward by the recoil of the spring when the force is removed. The shaft 153 is threaded and is engaged by a nut 191. The housing 155 is provided with a longitudinal slot in which extends an index 192 carried by the nut. The wall of the housing adjacent the slot is provided with graduations 193 which will indicate points of cut-off. When the hand wheel 154 is turned clockwise, viewed from the left Fig. 21, the nut 191 will travel toward the left and when the hand wheel is turned in the reverse direction the nut will travel toward the right, the index for any position of the nut denoting the point of cut-off. When the index is opposite the graduation at the right this will denote longest cut-off for forward motion and shortest cut-off for reverse motion, the index in moving to the left indicating shorter cut-offs for forward motion and longer cut-offs for reverse motion in a manner already described.

A bell crank 194 is pivoted to the housing 155 at the right hand end portion thereof, with its longer arm 195 directed toward the left and engaging, at its end, the end of the stem 189. When the bell crank is swung to raise the arm 195, as shown in full lines, the valve 188 will be raised, as shown in Fig. 21, the stem and arm being shown in dot and dash lines in their lowered position, the spring 190 then reacting to lower the valve. The raising and lowering of the valve controls the ports in the manner already described. The shorter arm 196 of the bell crank, when the longer arm is lowered, engages a stop pin 197.

To keep the nut 191 from turning and to raise and lower the arm 195 the nut is provided with a lug 198 which extends through a slot in the housing 155. Upon the end of this lug is pivotally mounted a cam element 199 which engages and disengages the arm 195 as the nut is moved respectively to the right and to the left. The cam element has integrally formed therewith and at right angles thereto a handle 200. Fig. 21 shows, in full lines, the handle in raised position and the cam element in active position and in engagement with the arm 195, and in dot and dash lines shows the handle and cam element turned 90° counter-clockwise to cam element inactive position.

It will be noted that the only time that the pipes 184 and 186 are in communication is when the cam element is in active position and in engagement with the arm 195. This is during movement of the index along the graduations at the right end of the scale, that is to say during long cut-offs for forward motion. As the cam element is not intended to be placed in active position except in forward motion, therefore it will be seen that for forward motion at long cut-offs, such as used for starting and climbing steep grades, the lead is reduced to an amount prearranged for, which in the present instance provides no lead. When the cam element moves a sufficient distance to the left it leaves the arm 195, the lead being simultaneously restored to normal. When the engine is in reverse the operator swings the handle 200 downwardly to cam element inactive position.

Fig. 26 illustrates diagrammatically an approved arrangement of cams. The cams in the upper horizontal row are the cut-off cams; those in the middle row are the admission cams; and those in the bottom row are exhaust cams. They are also arranged in vertical rows, the three cams in each vertical row showing their relative positions at substantially full stroke of the engine. The three first vertical rows (viewed from the left) are for forward motion and the admission and exhaust cams are those for forward motion, while the fourth vertical row is for backward or reverse motion, the admission and exhaust cams being those for reverse motion.

For convenience the cams are given reference numerals corresponding to those of the similar cams previously considered.

The first vertical row shows the cams for forward motion at full gear or longest cut-off, no lead. The extended face of the cut-off cam 67 has travelled on its cam roller at the right for the portion $a$ shown darkened. Lever 60 has been moved outwardly at its center a distance $m$ by this movement of the cam roller and the valve has been moved one-half its throw. The valves are given a small amount of lap and accordingly during this movement of the cam 67 the extended face of the cam 68 has moved its cam roller at the right slightly outwardly thereby further moving the center of the lever outwardly a distance $n$. This position of the rollers is the position for admission, and at this position the extended face of the exhaust cam 69 has moved its cam roller at the left to its position for initial exhaust port opening at the opposite end of the cylinder. Further movement of this exhaust cam fully opens the exhaust port and it stays open until the exhaust cam radially extended face leaves its cam roller at the left. The length of this extended face determines the duration of exhaust. Likewise further rotation of the admission cam 68 opens the admission port and this stays open until the radially extended face of the cut-off cam 67 leaves its roller at the right. The length of this extended face beyond the darkened portion $a$ determines the duration of admission.

The second vertical row shows the cams arranged also for forward motion full gear, but for 15° lead. Here the position of the cut-off cam 67 remains the same, but the admission and exhaust cams, which were (in the first vertical row) at their positions effected by applying the compressed air to cylinder 159, are now at the positions they will assume when the handle 200 is lowered to throw the cam element 199 out of operation. Here the cam 68 is advanced from its position assumed in the first vertical row to an amount providing 15° lead, and therefore the valve has been opening during the travel of the cam 68 through this difference in angular position. The exhaust cam 69, which is on the same shaft with the cam 68, has likewise been advanced through a similar angle from its position shown in the first vertical row, thereby advancing the release and closure.

The third vertical row shows the cut-off cam 67 adjusted for shortest cut-off. Here its shaft has been turned counter-clockwise by turning the hand wheel 154 as has already been described whereby the shaded portion *a* has been increased and the unshaded portion has been correspondingly decreased. The positions of the other two cams are the same as those in the second vertical row, both rows denoting forward motion, 15° lead.

The fourth row, which is for backward motion, full gear, no lead, shows the reverse admission cam 70 and reverse exhaust cam 71 which have been brought into active positions by shifting the hand lever 172 from forward to reverse position. The cut-off cam 67 remains the same. The three cams rotate in the reverse direction (clockwise) as shown by the arrows. The positions of the admission and exhaust cams are comparable with those of the first vertical row. If the cut-off cam had been allowed to remain in the same position as that of its position in the first vertical row the gear would have been set for backward motion, shortest cut-off, no lead, that is to say longest cut-off or full gear for forward motion is shortest cut-off for backward motion, and vice versa. The cut-off cam 67 has however been fully turned by rotation of the hand wheel 154 to the position assumed in the third vertical row, which illustrates the identity of positions of the cut-off cam for shortest cut-off forward motion and longest cut-off backward motion. This is indicated by the angles A which are similar.

While there has been hereinbefore described an approved embodiment of this invention, it will be understood that many and various changes and modifications in form, arrangement of parts and details of construction thereof may be made without departing from the spirit of the invention and that all such changes and modifications as fall within the scope of the appended claims are contemplated as a part of this invention.

In the claims the term "element" is employed, and it should be construed not as limited to a cam roller, but broadly as including any suitable part of the mechanism that engages the adjacent cam. For example it may be an integral part of the adjacent bell crank lever when considering an exhaust cam, and an integral part of the lever which is fulcrumed to the adjacent bell crank lever when considering admission or cut-off cams.

The invention claimed and desired to be secured by Letters Patent is:

1. In a steam locomotive, the combination of driving wheels; a steam power cylinder having an admission port; a piston for said cylinder; a valve controlling the admission of steam to said port; a shaft operating as the admission cam shaft for both forward and reverse movements; an admission cam secured thereon; another shaft operating as the cut-off cam shaft for both forward and reverse movements; a cut-off cam secured thereon; means for rotating said shafts in unison operably dependent upon the rotation of said driving wheels; means for rotating said cut-off cam shaft independently of the rotation of said admission cam shaft to adjust the phase of said cut-off cam relative to said admission cam to vary the cut-off, said cut-off cam shaft being held against axial movement during said independent rotation; and means connecting said valve with said cams for operation thereby including an element operably engaging said admission cam and another element operably engaging said cut-off cam.

2. In a steam locomotive, the combination of driving wheels; a steam power cylinder having an admission port; a piston for said cylinder; a valve controlling the admission of steam to said port; a shaft operating as the admission cam shaft for both forward and reverse movements; an admission cam secured thereon; another shaft operating as the cut-off cam shaft for both forward and reverse movements; a cut-off cam secured thereon; means for rotating said cut-off cam shaft operably dependent upon the rotation of said driving wheels; means for rotating said admission cam shaft in unison with said cut-off cam shaft when the rotation of the latter is operably dependent upon the rotation of said driving wheels, said cut-off cam shaft rotating means including a member adapted for operation independent of the operation by said driving wheels for rotating said cut-off cam shaft independently of the rotation of said admission cam shaft to adjust the phase of said cut-off cam relative to said admission cam to vary the cut-off, said cut-off, cam shaft being held against axial movement during said independent operation; and means connecting said valve with said cams for operation thereby including an element operably engaging said admission cam and another element operably engaging said cut-off cam.

3. In a steam locomotive, the combination of driving wheels; a steam power cylinder having an admission port; a piston for said cylinder; a valve controlling the admission of steam to said port; a shaft for admission cams; an admission cam for locomotive forward movement and an admission cam for locomotive reverse movement secured on said shaft; another shaft for a cut-off cam; a single cut-off cam secured thereon for operation as the cut-off cam with both said forward movement and said reverse movement admission cams; means for rotating said shafts in unison operably dependent upon the rotation of said driving wheels; means for axially moving said admission cam shaft relative to said cut-off cam shaft for selectively adjusting either of said admission cams secured thereon to active position for cooperation with said cut-off cam, and the other said admission cam to inactive position; and means connecting said valve with said cut-off cam and with said active admission cam for operation thereby including an element operably engaging said active admission cam and another element operably engaging said cut-off cam.

4. In a steam locomotive, the combination of driving wheels; a steam power cylinder having an admission port and valve therefor, and an exhaust port and valve therefor; a piston for said cylinder; a shaft having forward and reverse movement admission cams and forward and reverse movement exhaust cams secured thereon; another shaft for a cut-off cam; a single cut-off cam secured thereon for operation as the cut-off cam with both said forward movement and said reverse movement admission cams; means for rotating said shafts in unison operably dependent upon the rotation of said driving wheels; means for axially moving said admission and exhaust cam shaft relative to said cut-off cam shaft for selectively adjusting either exhaust cam to active position and the other exhaust cam to inactive position and either admission cam to corresponding active position for cooperation with said cut-off cam, and the other said admission cam to corresponding inactive position; means connecting said admission valve with said cut-off cam and with said active admission cam for operation thereby including an element operably engaging said active admission cam and another element operably engaging said cut-off cam; and means connecting said exhaust valve with said active exhaust cam for operation thereby including an element operably engaging said active exhaust cam.

5. In a steam locomotive, the combination of driving wheels; a steam power cylinder having an admission port; a piston for said cylinder; a valve controlling the admission of steam to said port; a shaft for admission cams; an admission cam for locomotive forward movement and an admission cam for locomotive reverse movement secured on said shaft; another shaft for a cut-off cam; a cut-off cam secured thereon; means for axially moving said admission cam shaft for selectively adjusting either of said cams secured thereon to active position and the other cam to inactive position; means connecting said valve with said cut-off cam and with said active admission cam for operation thereby including an element operably engaging said active admission cam and another element operably engaging said cut-off cam; means for rotating said shafts operably dependent upon the rotation of said driving wheels, each of said cams having a portion of its element engaging face spaced from the remaining portion, said cut-off cam spaced portion and said active admission cam spaced portion being adapted, when simultaneously engaging their respective elements to open said valve; and means for spacing said admission cam element away from its cam engaging position whereby said admission cams may be adjusted to and from their respective active positions while said element is in said spaced relation.

6. The combination of a steam power cylinder having a steam admission port; an admission slide valve controlling said port; an admission cam shaft; an admission cam secured thereon; a cut-off cam shaft; a cut-off cam secured thereon; means connecting said valve with said cams for operation thereby including elements, one engaging each of said cams, whereby said cut-off cam will effect partial movement of said valve from full stroke port closed position thereof to a position just prior to port opening, and said admission cam will effect further movement of said valve to full stroke port open position, and whereby said cut-off cam will effect partial movement of said valve from said full stroke port open position to port closed cut-off position and said admission cam will effect further movement of said valve from said port closed cut-off position to said full stroke port closed position.

7. A reciprocating steam engine comprising a power cylinder having an admission port; a piston for said cylinder; a valve controlling the admission of steam to said port; an admission cam shaft; an admission cam for forward movement and an admission cam for reverse movement secured on said shaft; another shaft for a cut-off cam; a single cut-off cam secured thereon for operation as the cut-off cam with both said forward movement and said reverse movement admission cams; means for axially moving said admission cam shaft relative to said cut-off cam shaft for selectively adjusting either of said cams secured thereon to active position and the other cam to inactive position; means connecting said valve with said cut-off cam and with said active admission cam for operation thereby including an element operably engaging said active admission cam and another element operably engaging said cut-off cam; means for rotating said admission cam shaft operably dependent upon the reciprocation of said piston; means for rotating said cut-off cam shaft operably dependent upon the reciprocation of said piston and adapted also for operation independent of said reciprocation; and means for independently operating said cut-off cam shaft rotating means whereby said cut-off cam is adjusted relative to said piston to effect a variation in the point of cut-off thereby providing for a range of cut-offs adapted for both forward and reverse direction of said engine but in the reverse order.

8. In a locomotive, the combination of a frame; a wheeled driving axle flexibly connected to said frame; a steam power cylinder having a port; a piston for said cylinder; a valve controlling said port; means for operating said valve including a shaft disposed transversely of said locomotive and having a cam secured thereon; a driven gear operatively connected with said shaft for rotation thereof; a driving gear engaging said driven gear for rotating same, said driving gear being journalled to prevent axial movement thereof; a gear casing rigidly secured to said frame; a worm gear journalled in said casing; flexible driving means flexibly connecting said worm gear with said driving axle for rotation thereby; a worm engaging said worm gear journalled in said casing for rotation by said worm gear and for independent rotation and consequent simultaneous axial movement relative to said worm gear; a shaft having connections with said worm and said driving gear whereby said cam shaft will be rotated by rotation of said driving axle and whereby said independent rotation and simultaneous axial movement of said worm effects only rotation of said driving gear whereby said cam will be rotated relative to said driving axle to change the phase of said cam; and means for imparting said independent rotation and simultaneous axial movement to said worm.

9. In a steam locomotive, the combination of driving wheels; a steam power cylinder having an admission port; a piston for said cylinder; a valve controlling the admission of steam to said port; a shaft operating as the admission cam shaft for both forward and reverse movements; an admission cam secured thereon; another shaft operating as the cut-off cam shaft for both forward and reverse movements; a cut-off cam secured thereon; means for rotating said admission cam shaft operably dependent upon the rotation of said driving wheels; means for rotating said cut-off cam shaft in unison with said admission cam shaft when the rotation of the latter is operably dependent upon the rotation of said driving wheels, said admission cam shaft rotating means including a member adapted for operation independent of the operation by said driving wheels for imparting only rotative movement to said admission cam shaft to adjust the phase of said admission cam relative to said cut-off cam to vary the point of admission; and means connecting said valve with said cams for operation thereby including an element operably engaging said admission cam and another element operably engaging said cut-off cam.

10. In a steam locomotive, the combination of driving wheels; a steam power cylinder having an admission port; a piston for said cylinder; a valve controlling the admission of steam to said port; a shaft operating as the admission cam shaft for both forward and reverse movements; an admission cam secured thereon; another shaft operating as the cut-off cam shaft for both forward and reverse movements; a cut-off cam secured thereon; separate means for rotating each of said shafts, connected to said driving wheels for operation thereby, the means for rotation of said cut-off cam shaft being adapted also for operation independent of the operation by said driving wheels, and the means for rotation of said admission cam shaft being adapted also for operation independent of the operation by said driving wheels; means for independently operating said cut-off cam shaft rotating means, whereby said cut-off cam is adjusted relative to said wheels to effect a variation in the point of cut-off; other means for independently operating said admission cam shaft rotating means dependently operable upon the operation of said means for independently operating said cut-off cam shaft rotating means, whereby said admission cam is adjusted relative to said wheels to effect a variation in the point of admission, said independent operation imparting only rotative movements to said shafts; and means connecting said valve with said cams for operation thereby including an element operably engaging said admission cam and another element operably engaging said cut-off cam.

11. A reciprocating steam engine comprising a power cylinder having a port; a piston for said cylinder; a crank rotated thereby; a valve controlling said port; means for operating said valve including a cut-off cam shaft having a cut-off cam secured thereon and an admission cam shaft having an admission cam secured thereon; separate independent means for rotating each said shaft and its said cam each including a separate worm gear operably dependent upon the rotation of said crank and a worm engaging and driven by said worm gear; separate and independent connecting means connecting each said worm with its respective cam shaft whereby rotation of said respective shaft will be effected by rotation of said worm and in timed relation with the rotation of said crank; and separate and independent operating means for each said worm, each adapted to move its respective worm axially for independent operation of each of said cam shafts for changing the phase of each said cam relative to said crank.

12. In a steam locomotive, the combination of driving wheels; a steam power cylinder having an admission port; a piston for said cylinder; a valve controlling the admission of steam to said port; a shaft for admission cams; an admission cam for forward movement and another admission cam for reverse movement secured on said shaft; another shaft for a cut-off cam; a single cut-off cam secured thereon for operation as the cut-off cam with both said forward movement and said reverse movement admission cams; means for axially moving said admission cam shaft for selectively adjusting either of said cams secured thereon to active position and the other cam to inactive position; means connecting said valve with said cut-off cam and with said active admission cam for operation thereby including an element operably engaging said active admission cam and another element operably engaging said cut-off cam; separate means for independently rotating each of said shafts, connected to said driving wheels for operation thereby, the means for rotation of said cut-off cam shaft being adapted also for operation independent of the operation by said driving wheels, and the means for rotation of said admission cam shaft being adapted also for operation independent of the operation by said driving wheels, whereby said admission cam for forward movement, when in active position, may be rotated for adjustment from maximum to minimum lead positions; means for effecting said independent operation of said cut-off cam shaft rotating means, whereby said cut-off cam is adjusted relative to said wheels to effect variation in the point of cut-off; means for effecting said independent operation of said admission cam shaft rotating means dependently operable, during said adjustment of said admission cam, upon the operation of said means for independently operating said cut-off cam shaft rotating means during adjustment of said cut-off cam from short to long cut-off positions; and controlling means for rendering effective or ineffective said means for effecting said independent operation of said admission cam shaft rotating means.

13. In a steam locomotive, the combination of driving wheels; a steam power cylinder having an admission port; a piston for said cylinder; a valve controlling the admission of steam to said port; a shaft operating as the admission cam shaft for both forward and reverse movements; an admission cam secured thereon; another shaft operating as the cut-off cam shaft for both forward and reverse movements; a cut-off cam secured thereon; separate means for rotating said shafts operably dependent upon the rotation of said driving wheels, each including a member adapted also for operation independent of the operation by said driving wheels, for respectively rotating said shafts to adjust the phases of said cams thereon relative to said driving wheels to vary the points of admission and cut-off, said independent operations imparting only rotative movements to said shafts; and means connecting said valve with said cams for operation thereby including an element operably engaging said admission and another element operably engaging said cut-off cam.

14. In a steam locomotive, the combination of driving wheels; a steam power cylinder having an admission port; a piston for said cylinder; a valve controlling the admission of steam to said port; a shaft for admission cams; an admission cam for forward movement and an admission cam for reverse movement secured on said shaft; operating means for rotating said shaft to effect steam admission; means for independently rotating said shaft to effect adjustment of the point of steam admission; independent means for axially moving said shaft to effect adjustment of either of said forward or reverse cams to active position; another shaft for a cut-off cam; a cut-off cam secured thereon; means for operating said cut-off cam shaft; and means connecting said valve with said cut-off cam and said active admission cam for operation thereby including an element operably engaging said admission cam and another element operably engaging said cut-off cam.

15. In a steam locomotive, the combination of driving wheels; a steam power cylinder having an admission port; a piston for said cylinder; a valve controlling the admission of steam to said port; a shaft for admission cams; an admission cam for forward movement and an admission cam for reverse movement secured on said shaft; operating means for rotating said shaft to effect steam admission; means for independently rotating said shaft to effect adjustment of the point of steam admission; independent means for axially moving said shaft to effect adjustment of either of said forward or reverse cams to active position; another shaft for a cut-off cam; a cut-off cam secured thereon; independent operating means for rotating said cut-off cam shaft to effect steam cut-off; means for independently rotating said shaft to effect adjustment of the point of cut-off; and means connecting said valve with said cut-off cam and said active admission cam for operation thereby including an element operably engaging said admission cam and another element operably engaging said cut-off cam.

ROGER W. CLIFFORD.